United States Patent [19]

Cottman

[11] 4,394,476

[45] Jul. 19, 1983

[54] DIESTER ANTIOXIDANTS

[75] Inventor: Kirkwood S. Cottman, Akron, Ohio

[73] Assignee: The Goodyear Tire & Rubber Company, Akron, Ohio

[21] Appl. No.: 396,935

[22] Filed: Jul. 9, 1982

Related U.S. Application Data

[63] Continuation of Ser. No. 243,323, Mar. 13, 1981, abandoned.

[51] Int. Cl.$^3$ ............................................. C08K 5/13
[52] U.S. Cl. ................................................... 524/289
[58] Field of Search ......................................... 524/289

[56] References Cited

U.S. PATENT DOCUMENTS

| | | | |
|---|---|---|---|
| 3,553,163 | 1/1971 | Spacht | 260/45.95 C |
| 3,565,857 | 2/1971 | Spacht | 260/45.95 C |
| 3,751,483 | 8/1973 | Cisney | 260/45.95 C |
| 3,810,929 | 5/1974 | Song | 260/45.85 T |
| 4,021,408 | 5/1977 | Horn et al. | 260/45.85 T |
| 4,108,831 | 8/1978 | Cottman | 260/45.95 C |
| 4,132,702 | 1/1979 | Schmidt et al. | 260/45.85 T |
| 4,261,912 | 4/1981 | Tracy | 560/45.85 T |

*Primary Examiner*—V. P. Hoke
*Attorney, Agent, or Firm*—D. O. Nickey

[57] ABSTRACT

Esters of alkyl thiomercaptophenols, such as bis[2-(3,5-ditertiary butyl-4-hydroxyphenylthio)-1-methylethyl]-thiodipropionate, used as antioxidants to stabilize polymers against oxidated degradation.

5 Claims, No Drawings

DIESTER ANTIOXIDANTS

This is a continuation of application Ser. No. 243,323, filed Mar. 13, 1981, now abandoned.

TECHNICAL FIELD

The present invention provides highly non-volatile antioxidants that can be used as stabilizers in oxidizable organic materials.

BACKGROUND OF THE INVENTION

This invention relates to esters of alkyl thiomercaptophenols as antioxidants. U.S. Pat. No. 3,553,163 reveals ring-substituted alkylthiophenolic antioxidants. U.S. Pat. No. 3,565,857 reveals alkylthio-substituted polynuclear phenolic antioxidants. Canadian Pat. No. 1,293,131 reveals the preparation of ring-substituted mercaptophenols. U.S. Pat. No. 3,751,483 reveals the preparation of phenolic thio esters while U.S. Pat. No. 4,108,831 reveals the use of hydroxy alkylthiophenols as antioxidants.

Those skilled in the art are constantly searching for less volatile and more persistent antioxidant systems for polymers subject to oxidative degradation, however, none of the patents referred to above, or other publications have disclosed or suggested the use of esters of alkyl thiomercaptophenols as antioxidants in oxidizable organic polymers.

DISCLOSURE OF THE INVENTION

There is disclosed a polymer susceptible to oxidative degradation having incorporated therein a stabilizing amount of the compound having the following structural formula:

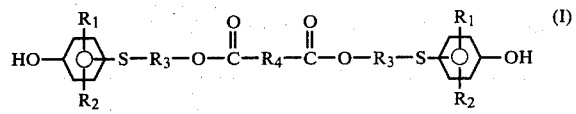

wherein $R_1$ and $R_2$ are selected from the group consisting of hydrogen, alkyl radicals of 1 to 4 carbon atoms and aralkyl radicals containing 7 to 9 carbon atoms; $R_3$ is a divalent alkylene radical containing 2 to 8 carbon atoms or a radical of the structural formula:

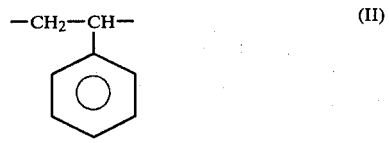

and $R_4$ is an alkylene radical containing 2 to 10 carbon atoms, a phenylene radical, or a radical of the structural formula:

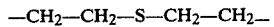

The compounds of the present invention employed to stabilize organic polymers subject to oxidative degradation are prepared by reacting a compound of structural formula (III):

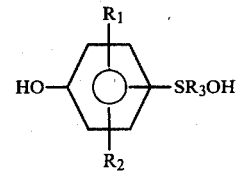

wherein $R_1$ and $R_2$ as defined above with a compound of structural formula (IV):

wherein X is a chlorine or bromine radical or a radical of the structural formula $—OR_5$, wherein $R_5$ is a hydrogen radical or an alkyl radical of 1 to 3 carbon atoms, to form esters that may be represented by structural formula (I).

Preferably in structural formula (I), $R_1$ and $R_2$ are ortho to the phenolic hydroxyl group and the sulfur group is para to the phenolic hydroxyl group.

The following compounds illustrate but are not intended to limit the representative compounds of structural formula (III).
2,6-ditertiary butyl-4-(2-hydroxyethylthio)phenol
2-(hydroxyethylthio)phenol
2,6-ditertiary butyl-4-(2-hydroxypropylthio)phenol
2,6-ditertiary butyl-4-(1-methyl-2-hydroxyethylthio)phenol
2,6-dimethyl-4-(3-hydroxypropylthio)phenol
2-tertiary butyl-4-methyl-6-(2-hydroxyethylthio)phenol
2-tertiary butyl-4-(2-hydroxypropylthio)phenol
2,6-ditertiary butyl-4-(8-hydroxyoctylthio)phenol
2-(alpha-phenylethyl)-4-(2-hydroxypropylthio)phenol
2,6-ditertiary butyl-4-(2-hydroxy-2-phenylethylthio)phenol
2,6-ditertiary butyl-4-(6-hydroxyhexylthio)phenol The following compounds illustrate but are not intended to limit the compounds representative of structural formula (IV).
Succinic acid
Glutaric acid
Adipic acid
Sebacic acid
3,3'-thiodipropionic acid
Terephthalic acid The polymers that may be conveniently protected by the compounds of structural formula (I) are oxidizable vulcanized and unvulcanized polymers susceptible to oxygen degradation, such as natural rubber, balata, gutta percha and oxidizable synthetic polymers including those containing carbon-to-carbon double bonds, such as rubbery diene polymers, both conjugated and nonconjugated. Representative examples of the synthetic polymers used in the practice of this invention are polychloroprene; homopolymers of a conjugated 1,3-diene such as isoprene and butadiene, and in particular, polyisoprenes and polybutadienes having essentially all of their repeat units combined in a cis-1,4 structure; copolymers of a conjugated 1,3-diene such as isoprene and butadiene with up to 50 percent by weight of at least one copolymerizable monomer including ethylenically unsaturated monomers such as styrene and acrylonitrile; butyl rubber, which is a polymerization product of a major proportion of a monolefin and a minor proportion of a multi-olefin such as butadiene or isoprene; polyurethanes containing carbon-to-carbon double bonds; and polymers and copolymers of mono-olefins containing little or no unsaturation, such as polyethylene, polypropylene, ethylene propylene copolymers and terpolymers of ethylene, propylene and a conjugated diene such as dicyclopentadiene, 1,4-hexadiene, ethylidene norbornene and methylene norbornene.

Polyesters can also be stabilized with these compounds as well as oils and hydrocarbons derived from oil.

MORE DETAILED DISCLOSURE

The preparation of the compounds of the present invention is carried out by reacting compounds of structural formula (III) with those of structural formula (IV). When X is —$OR_5$ the reaction may be done neat, otherwise an inert solvent such as benzene, toluene or xylene may be used under acid conditions. Suitable acid catalysts are toluene solfonic acid, sulfuric acid and acidic resins. The temperature of the reaction may be up to the boiling point of the reactants or solvent. The by-product of the reaction which is a low boiling alcohol or water may be removed by an appropriate azeotropic solvent or under vacuum.

When X is a halogen in structural formula (IV), it is desirable to use a base such as triethylamine, sodium carbonate or pyridine to react with the hydrogen halide forming during the reaction.

None of the aforementioned process information is meant to be critical to the present invention, as the compounds will be effective as antioxidants regardless of their method of preparation.

Examples of compounds of this invention conforming to structural formula (I) are:
bis[2-(3,5-ditertiary butyl-4-hydroxyphenylthio)-1-methylethyl]adipate
bis[2-(3,5-ditertiary butyl-4-hydroxyphenylthio)-1-methylethyl]thiodipropionate
bis[2-(3,5-ditertiary butyl-4-hydroxyphenylthio)-1-methylethyl]sebacate The following examples are intended to illustrate but not to limit the scope of the present invention:

EXAMPLE I

To a 3-neck flask equipped with agitator, thermometer and condenser was charged 55 g. of 1-(3,5-ditertiary butyl-4-hydroxyphenylthio)-2-hydroxypropane, ¾ g. toluenesulfonic acid, 100 ml. toluene and 17.1 g. sebacic acid. The mixture was refluxed and the water collected in a water trap. The reaction was followed by gas chromatography until the phenolic had all reacted. The product was washed with water and then the volatiles were stripped off. Weight 64 g. The product was bis[2-(3,5-ditertiary butyl-4-hydroxyphenylthio)-1-methylethyl]sebacate. Yield 64 g.

EXAMPLE II

To the reaction vessel of Example I was charged 63 g. of 1-(3,5-ditertiary butyl-4-hydroxyphenylthio)-2-hydroxypropane, 2 drops toluenesulfonic acid and 14.8 g. adipic acid were heated at 145° C. for one hour. The volatiles were then stripped off at pot 125° C. at 20 mm. Hg. The product was characterized as bis[2-(3,5-ditertiary butyl-4-hydroxyphenylthio)-1-methylethyl]adipate.

EXAMPLE III

To the reaction vessel of Example I was charged 54 g. 1-(3,5-ditertiary butyl-4-hydroxyphenylthio)-2-hydroxypropane, 15 g. 3,3'-thiodipropionic acid, ½ g. toluenesulfonic acid, 150 ml. xylene and heated to reflux. The water formed during the reaction was azeotroped off. After reacting for 3 hours, gas chromatographic analysis indicated the phenolic had all reacted. The volatiles were stripped off. The product was bis[2-(3,5-ditertiary butyl-4-hydroxyphenylthio)-1-methylethyl]thiodipropionate.

TEST DATA

To test the effectiveness of the compounds of the present invention, the compounds prepared in Examples I, II and III and two other compounds and a control were evaluated in an oxygen absorption test in SBR 1006 at 100° C. using 1 part per hundred stabilizer by weight of rubber. The results are found in Table I. Also included in Table I is data wherein the compounds were evaluated in polypropylene at 140° C. at 0.1 part per hundred by weight of polypropylene.

| Compound From | Hours to Absorb 1.0% $O_2$ | Days to Failure at 140° C. in Polypropylene |
|---|---|---|
| (1) Example I | 302 | 12 |
| (2) Example II | 256 | 11 |
| (3) Example III | 334 | 22 |
| (4) [structure] | 289 | 16 |
| (5) [structure] | 264 | 11 |
| (6) Control - Wing Stay L* | 329 | N/A |
| (7) No Stabilizer | ≈20 | ≈2 |

*Trade Name of The Goodyear Tire & Rubber Company for the butylated reaction product of para-cresol and dicyclopentadiene.

INDUSTRIAL APPLICABILITY

The compounds of the present invention are obviously utilizable as stabilizers for organic polymers subject to oxidative degradation.

While certain representative embodiments and details have been shown for the purpose of illustrating the invention it will be apparent to those skilled in this art that various changes and modifications may be made therein without departing from the spirit or scope of the invention.

I claim:

1. A polymer susceptible to oxidative degradation having incorporated therein a stabilizing amount of a compound having the following structural formula:

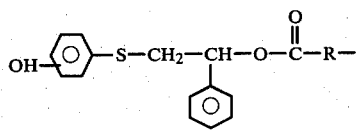

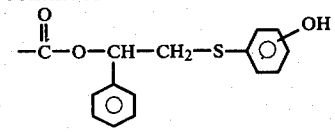

wherein R is an alkylene radical containing 2 to 10 carbon atoms, a phenylene radical, or a radical of the structural formula:

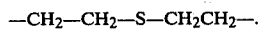

2. The polymer according to claim 1 wherein R is the radical:

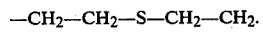

3. The polymer according to claim 1 wherein R is a phenylene radical.

4. The polymer according to claim 1 wherein R is an alkylene radical of 2 to 10 carbon atoms.

5. The polymer according to claim 1 wherein the hydroxyl groups is para to the sulfur atom.

* * * * *